United States Patent
Fah

(10) Patent No.: US 6,229,268 B1
(45) Date of Patent: May 8, 2001

(54) DEVICE FOR SUPPLYING POWER TO AT LEAST ONE BROMINE TUNGSTEN FILAMENT LAMP

(75) Inventor: Foo Onn Fah, Kowloon (HK)

(73) Assignee: Mass Technology (H.K.) Ltd., Kowloon (HK)

( * ) Notice: Subject to any disclaimer, the term of this patent is extended or adjusted under 35 U.S.C. 154(b) by 0 days.

(21) Appl. No.: 09/362,712

(22) Filed: Jul. 29, 1999

(30) Foreign Application Priority Data

Sep. 1, 1998 (EP) .................................................. 98116527

(51) Int. Cl.$^7$ .................................................. H05B 37/00
(52) U.S. Cl. ........................ 315/287; 315/209 R; 315/276
(58) Field of Search .................................... 315/287, 244, 315/209 R, 276

(56) References Cited

U.S. PATENT DOCUMENTS

| 4,360,783 |   | 11/1982 | Nagasawa et al. . |
|-----------|---|---------|-------------------|
| 4,423,478 |   | 12/1983 | Bullock et al. . |
| 4,906,901 | * | 3/1990  | Carroll ................................ 315/297 |
| 5,128,593 | * | 7/1992  | Gilbert ................................ 315/287 |
| 5,343,122 | * | 8/1994  | Sugimori et al. ................ 315/209 R |
| 5,537,008 | * | 7/1996  | Matsuda et al. ................ 315/200 R |

* cited by examiner

*Primary Examiner*—David Vu
(74) *Attorney, Agent, or Firm*—Dennison, Scheiner, Schultz & Wakeman

(57) ABSTRACT

An alternating current—pulsating direct current converter (6) is adopted for eliminating unfavourable effects of feeder line, used in the electronic transformer of bromine tungsten filament lamp (5), such as half-wave, full-wave and bridge-type converters. Input signal is an alternating current one. After output signal is transformed, the effect of impedance change of feeder line (4) is eliminated, thus making output match and stabilisation.

4 Claims, 2 Drawing Sheets

DEVICE FOR SUPPLYING POWER TO AT LEAST ONE BROMINE TUNGSTEN FILAMENT LAMP

The present invention relates to a device for supplying power to at least one bromine tungsten filament lamp comprising an electronic transformer composed at least of a frequency converter for generating a high-frequency output and a high-frequency transformer.

BACKGROUND OF THE INVENTION

A bromine tungsten filament lamp is a large kind of light source for modem lighting, and most of service voltages of bromine tungsten filament lamps are low voltage of 12 V. Therefore, when 120V/50 Hz or 220V/50 Hz power supply is adopted, transformer must be used. At present there are two kinds of transformers for bromine tungsten filament lamps. One is iron-core transformer and the other electronic transformer. The advantage of the former is simple circuit, but the disadvantages are high consumption, heavy weight and large size. For higher power, the disadvantages are more obvious. The advantages of the latter are low consumption, small size and light weight. Therefore, the electronic transformer of bromine tungsten filament lamp has been extensively used. The principle of frequency conversion and voltage transformation is applied to electronic transformer, which is composed of rectification filter circuit, frequency conversion circuit and high-frequency transformer. The frequency of electronic transformer is 20–60 Khz. The development of modern lighting requires multi-region directional lighting, so one electronic transformer of bromine tungsten filament lamp is required to have the function of being used by several bromine tungsten filament lamps. Meanwhile a certain length of output feeder line must be used. But because the working frequency of bromine tungsten filament lamp is rather high, the transmission impedance of output feeder line itself is low. The impedance is close to that of bromine tungsten filament lamp. Besides, in installation, the length of feeder line and distance between lines are not fixed by the user and the number of bromine tungsten filament lamp not fixed either. Therefore, the serious mismatched output will occur. Practice shows that when the output is mismatched, the output power is lowered and the luminance lowered too. In the most serious case, the frequency conversion switching transistor of the frequency converter will be burnt. If the number of installed lamps is rather small, the load is less than nominal power and the lamps will be overpowered, their life shortened and the switching transistor burnt. On account of the above causes, the current electronic transformer of bromine tungsten filament lamp sold in the market cannot be connected with output feeder line.

SUMMARY OF THE INVENTION

An object of the present invention is to provide a device for eliminating the unfavourable effect due to feeder line connection to the high-frequency transformer of the electronic transformer for supplying power to at least one bromine tungsten filament lamp.

In a device for supplying power to at least one bromine tungsten filament lamp comprising an electronic transformer composed at least of a frequency converter and a high-frequency transformer this object and other objects are attained according to the invention by providing an alternating current to pulsating direct current converter connected in between the output of the high-frequency transformer and the feeder line of the bromine tungsten filament lamp. The alternating current to pulsating current converter is connected by its input terminal externally to the output of the high-frequency output transformer of the electronic transformer and by its output terminal to the load for supplying a pulsating direct current. The eliminator device according to the present invention makes it possible to overcome the mismatching of output caused by output feeder line.

In an embodiment of the invention the alternating current—direct current converter is a half-wave, full-wave or bridge type alternating current—pulsating current converter.

After the power supply of high frequency output passes through this eliminator device for unfavourable effects of feeder line, the wave form of current is transformed, the effect of impedance change of feeder line eliminated and the matching and stability of output is achieved. The electronic transformer operates normally. Frequency conversion switching transistor is not easy to burn.

The above features and advantages of the invention will be more fully understood from the description of embodiments by way of example only with reference to the accompanying illustrative drawings in which:

DETAILED DESCRIPTION OF THE PREFERRED EMBODIMENTS

As shown in Diagram 1, an electronic transformer of bromine tungsten filament lamp is composed of rectification filter circuit 1, frequency conversion circuit 2 and high-frequency transformer 3. By means of output feeder line 4, the output terminal of high-frequency transformer 3 is connected to bromine tungsten filament lamp 5.

Figure 1:
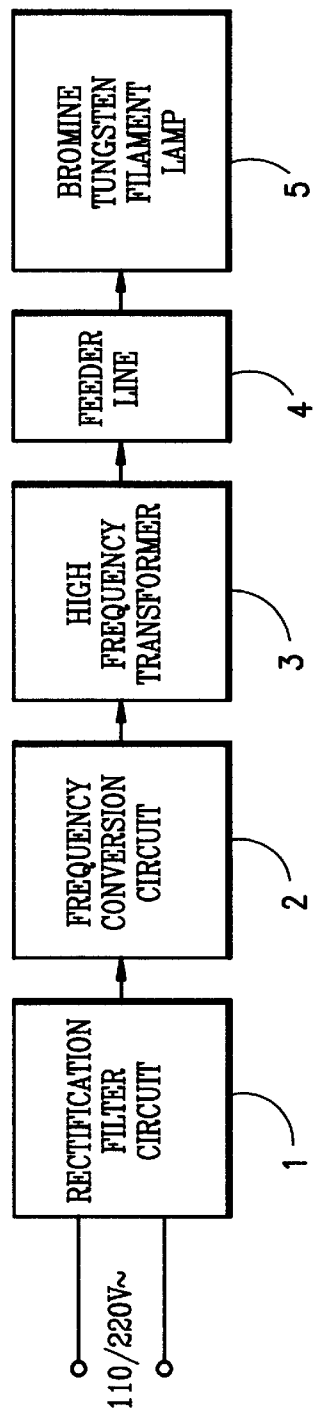
FIG. 1 is a block diagram of a prior art circuit when feeder line is used in the electronic transformer of bromine tungsten filament lamp.
Figure 2:
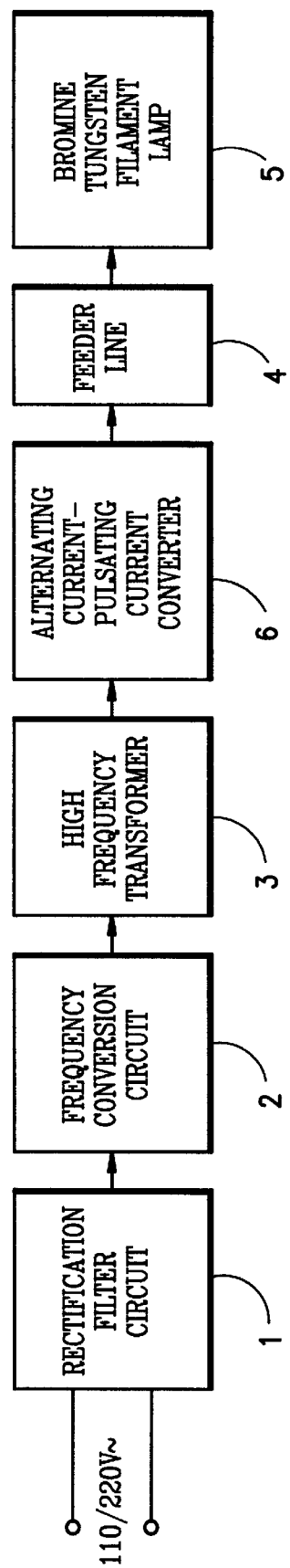
FIG. 2 is a block diagram of a circuit according to the invention when feeder line is used in the electronic transformer of bromine tungsten filament lamp.

FIG. 2 shows a schematic or block diagram of an electronic transformer of bromine tungsten filament lamp composed of rectification filter circuit 1, frequency conversion circuit 2, high-frequency transformer 3 and alternating current—pulsating direct current converter connected by its input terminal to the output of high-frequency transformer 3 and by its output terminal to a load which is a feeder line 4 supplying power to at least one bromine tungsten filament lamp 5.

Figure 5:
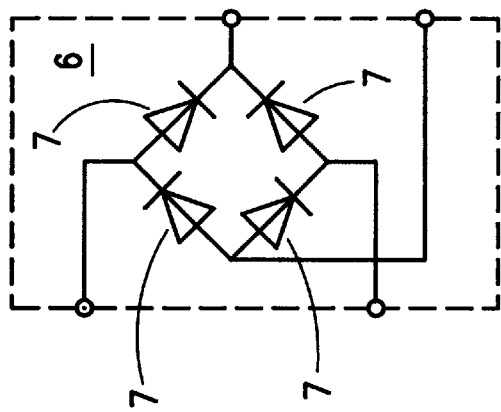
FIG. 5 is a schematic diagram of circuits of bridge-type alternating current—pulsating direct current converter according to the present invention.
Figure 4:
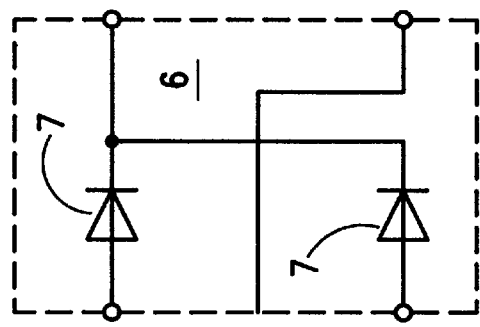
FIG. 4 is a schematic diagram of circuits of full-wave alternating current—pulsating direct current converter according to the present invention.
Figure 3:
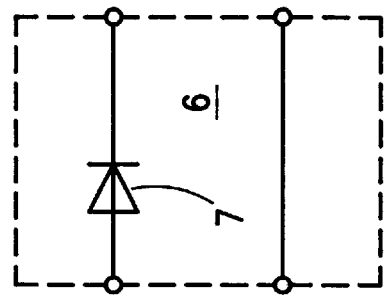
FIG. 3 is a schematic diagram of circuits of halve-wave alternating current—pulsating direct current converter according to the present invention.

FIGS. 3–5 show the circuit principle of half-wave, full-wave and bridge-type alternating current—pulsating direct current converters, respectively. These circuits are similar to half-wave, full-wave and bridge-type rectification circuits. According to the invention a high-frequency diode 7 is adopted such as Schottky diode. In diagram 3–5 the diodes 7 can have backward linkage.

Table 1 shows the practically measured data of electronic transformer, the nominal powers of which are 50, 100, 200 W respectively.

TABLE 1

[W]

| | Nominal power | Length of feeder line and line distance | | | | | |
|---|---|---|---|---|---|---|---|
| | | Line length < 0.2 m | | Line length < 2.5 m | | Line length < 5 m | |
| | | Close line distance | Line distance 0.2 m | Close line distance | Line distance 0.2 m | Close line distance | Line distance 0.2 m |
| Power fluctuation without the eliminator of effect of feeder line | 50 | 52 | 51 | 50 | 47 | 47 | 40 |
| | 100 | 100 | 98 | 87 | 80 | 72 | 63 |
| | 200 | 200 | 195 | 185 | 150 | 145 | 120 |
| Power fluctuation with the eliminator of effect of feeder line | 50 | 52 | 52 | 51 | 51 | 50 | 50 |
| | 100 | 100 | 100 | 95 | 95 | 93 | 93 |
| | 200 | 200 | 200 | 190 | 190 | 180 | 180 |

If we make an experiment of reduction of output load, on electronic transformers with nominal power 100 W and 200 W. The electronic transformer with nominal power 100 W is only connected to one 50 W bromine tungsten filament lamp and the electronic transformer with nominal power 200 W only connected to two or one 50 W bromine tungsten filament lamp. This time if no eliminator of effect of feeder line is connected, the frequency conversion switching transistor will be heated seriously and burnt. If the eliminator circuit is connected, the operation will be normal.

What is claimed is:

1. A device for supplying power to at least one bromine tungsten filament lamp comprising an electronic transformer including at least a frequency converter (2) for generating a high-frequency output, a high-frequency transformer (3) and an alternating current to pulsating direct current converter (6) connected in between the output of said high-frequency transformer (3) and a feeder line (4) having a length greater than about 0.2 meters, said feeder line being connected to said at least one bromine tungsten filament lamp (5).

2. A device according to claim 1 wherein the input terminal of said alternating current to pulsating direct current converter (6) is connected externally to the output terminal of said high-frequency output transformer (3), and the output terminal of said alternating current to pulsating direct current converter (6) is connected to said feeder line.

3. A device according to claim 1 wherein said alternating current to pulsating direct current converter (6) is a half-wave or full-wave or bridge-type alternating current—pulsating direct current converter.

4. A device according to claim 1 wherein said half-wave or full-wave or bridge-type alternating current—pulsating direct current converter (6) includes a plurality of interconnected diodes.

* * * * *